(No Model.)
A. H. SIMPSON.
APPARATUS FOR TRAINING HORSES OR OTHER ANIMALS.
No. 544,868. Patented Aug. 20, 1895.
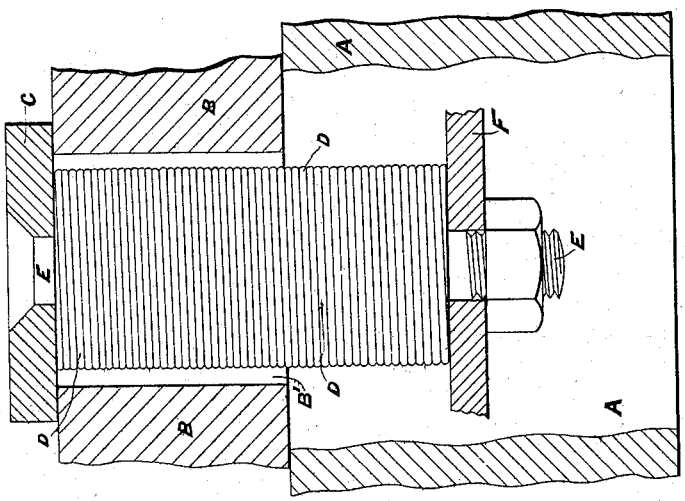
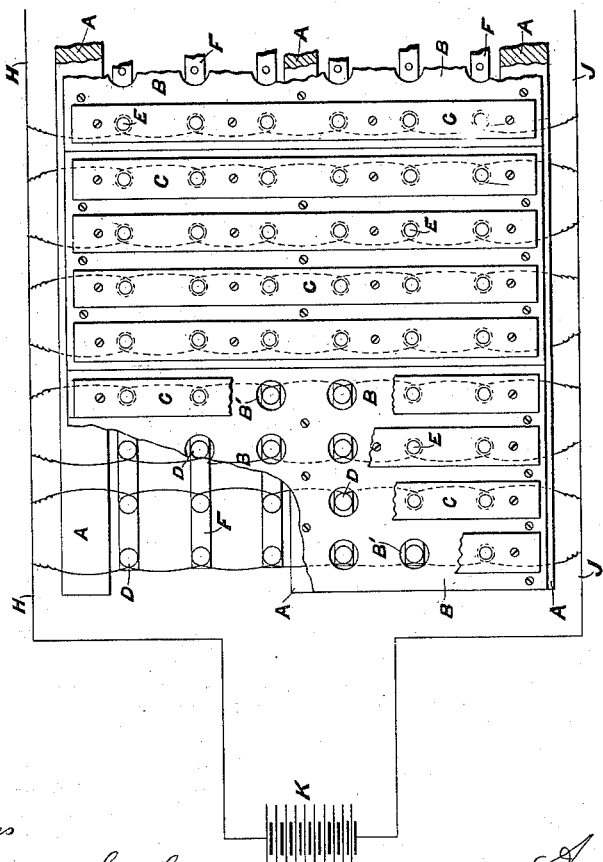
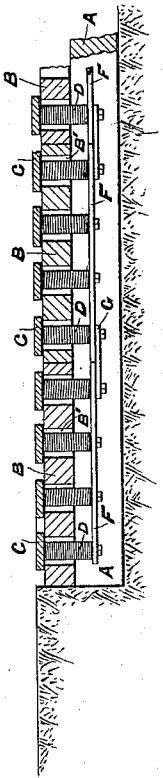

UNITED STATES PATENT OFFICE.

ALBERT HENRY SIMPSON, OF LEEDS, ENGLAND.

APPARATUS FOR TRAINING HORSES OR OTHER ANIMALS.

SPECIFICATION forming part of Letters Patent No. 544,868, dated August 20, 1895.

Application filed April 11, 1895. Serial No. 545,301. (No model.) Patented in England March 13, 1895, No. 5,330.

*To all whom it may concern:*

Be it known that I, ALBERT HENRY SIMPSON, a subject of the Queen of Great Britain and Ireland, and a resident of Leeds, in the county of York, England, have invented certain new and useful Improvements in Apparatus for Training Horses and other Animals, (for which I have obtained a patent in Great Britain, No. 5,330, bearing date March 13, 1895,) of which the following is a specification.

The object of my invention is to construct apparatus whereby the action of horses and other animals (hereinafter termed "horses") is greatly improved, and they are thus trained to walk and trot with ease and grace, such training being quickly and efficiently accomplished without unnecessary fatigue to the horse under training.

Hitherto it has been customary when training horses for the purpose of improving their action to attach weights to their hoofs or to employ abnormally-heavy shoes. This extra weight compels the horse to raise his feet in walking, thereby developing the muscles, so that when the weights or heavy shoes are removed and the horse is shod in the usual manner he immediately feels the relief and steps out well with good action. This weighting, however, is very tiring to the horse, as it gives him unnecessary work to perform, for when the hoof is properly lifted from the ground the extra weight is superfluous and acts detrimentally in the training effect which is desired to be produced.

According to my invention I employ a track having a surface composed of metallic plates, which are rendered magnetic by the action of an electric current. The horse to be trained is made to walk or trot on the said track and the magnetic attraction holds the iron-shod hoofs down with a certain force, which is only felt when the shoes are in contact with or adjacent to the said track. In this manner the horse is made to lift a certain weight in lifting the foot, but he is relieved of that weight when once the foot is raised, and thus the required training effect is given without causing unnecessary fatigue.

I will now proceed to describe my invention with reference to the accompanying drawings, which show a good form of a convenient embodiment of my said invention, the particular subject-matter claimed as novel being hereinafter definitely set forth.

Figure 1 is a plan of a magnetic track constructed according to my invention, and Fig. 2 is a cross-section of same. Fig. 3 is an enlarged part cross-section.

Referring to the drawings, A are beams which are sunk to the required depth in the ground and run longitudinally with the track, so as to form a support for boards B, which are placed transversely thereon. To the upper surface of these transverse boards B, I screw or otherwise attach the plates C, which carry on the under side magnetizing-coils D, the latter passing through holes B' and being attached in their relative positions on the plates C by means of bolts E. The lower ends of the bolts E are coupled in rows by the pieces F, which form connections between the plates C, thus causing the alternate plates to become north and south magnetic poles.

The boards B, carrying a given number of plates C and magnetizing-coils D, are placed on the beams A in sections, the connecting-pieces F of each section being fastened together by means of fish-plates G. The magnetizing-wires are wound alternately to the right and left in rows, the wires on one row of coils D being wound to the right and the wires on the next row of coils being wound to the left, and the ends of the wires on each row of coils are attached to trunk-wires H and J, which are situated at either side of the track. These trunk-wires H and J are connected to a battery, dynamo, or other electric generator K, and the current which is transmitted causes the plates C to become magnetic. The strength of the magnetism produced on the surface of the track corresponds with the strength of current passing through the wires, and the magnetic power may be regulated as required to suit the strength or step of the horse, and by increasing the current day by day a horse may be gradually trained with daily increasing resistance to the feet.

Although I have described my invention with reference to a magnetic track combined with ordinary metallic horseshoes, yet it is evident that the track may be made of ordinary iron and the shoes may be magnetized, with a like result to the horse under training.

Having now described my invention, what I claim as new, and desire to secure by Letters Patent, is—

1. An apparatus for training horses, comprising a metallic track and means for electrically exciting the same, substantially as and for the purposes set forth.

2. In an apparatus for training horses, the combination with the plates which are provided with magnetizing coils and which plates form a track, of means for electrically exciting the same, substantially as and for the purposes set forth.

3. In an apparatus for training horses, the plates forming a track and carrying magnetizing coils which are connected in such a manner as to form alternately north and south magnetic poles, in combination with means for electrically exciting the track, substantially as and for the purposes set forth.

In witness whereof I have hereunto set my hand in presence of two witnesses.

ALBERT HENRY SIMPSON.

Witnesses:
GRIFFITH BREWER,
JOHN JOWETT.